Aug. 21, 1956  E. E. WILLS  2,760,123
ENCLOSED PANELBOARD MOUNTING
Filed Nov. 6, 1951  2 Sheets-Sheet 2
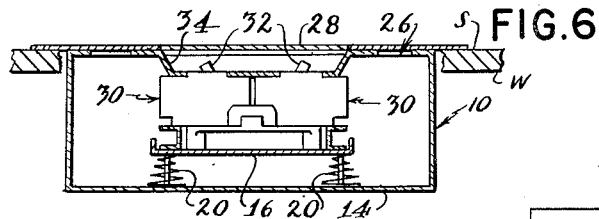
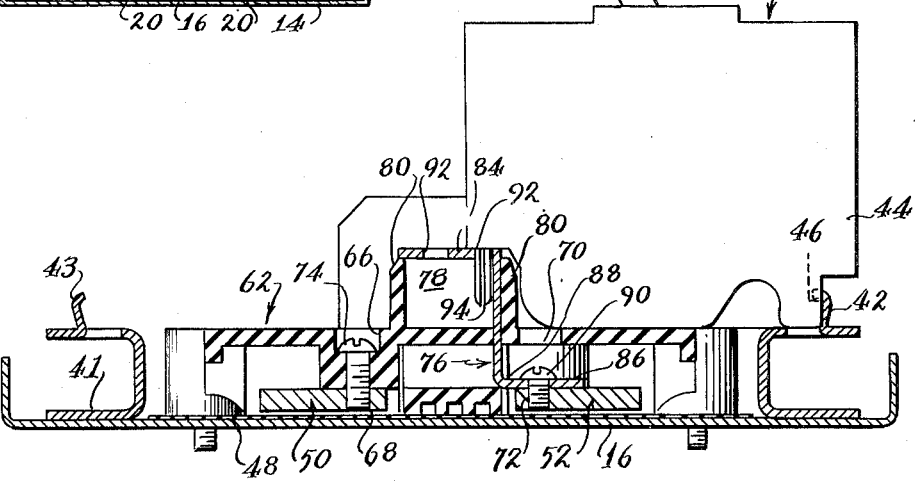
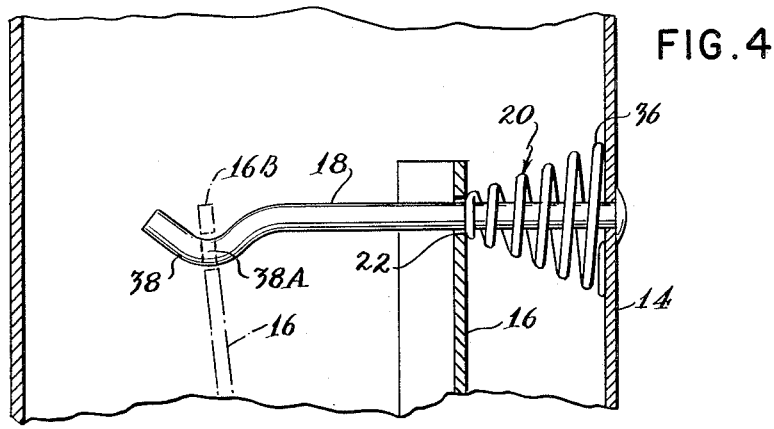
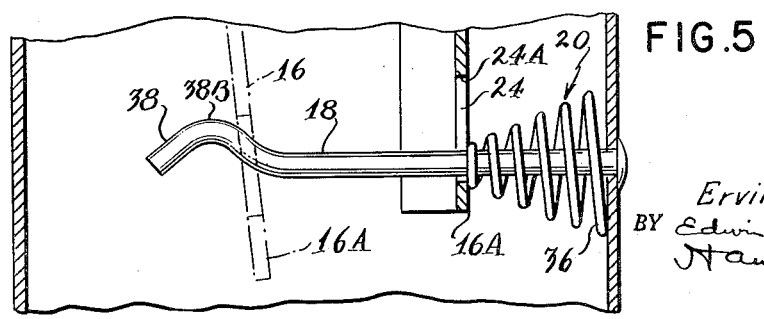
INVENTOR.
Ervin E. Wills
BY
ATTORNEYS

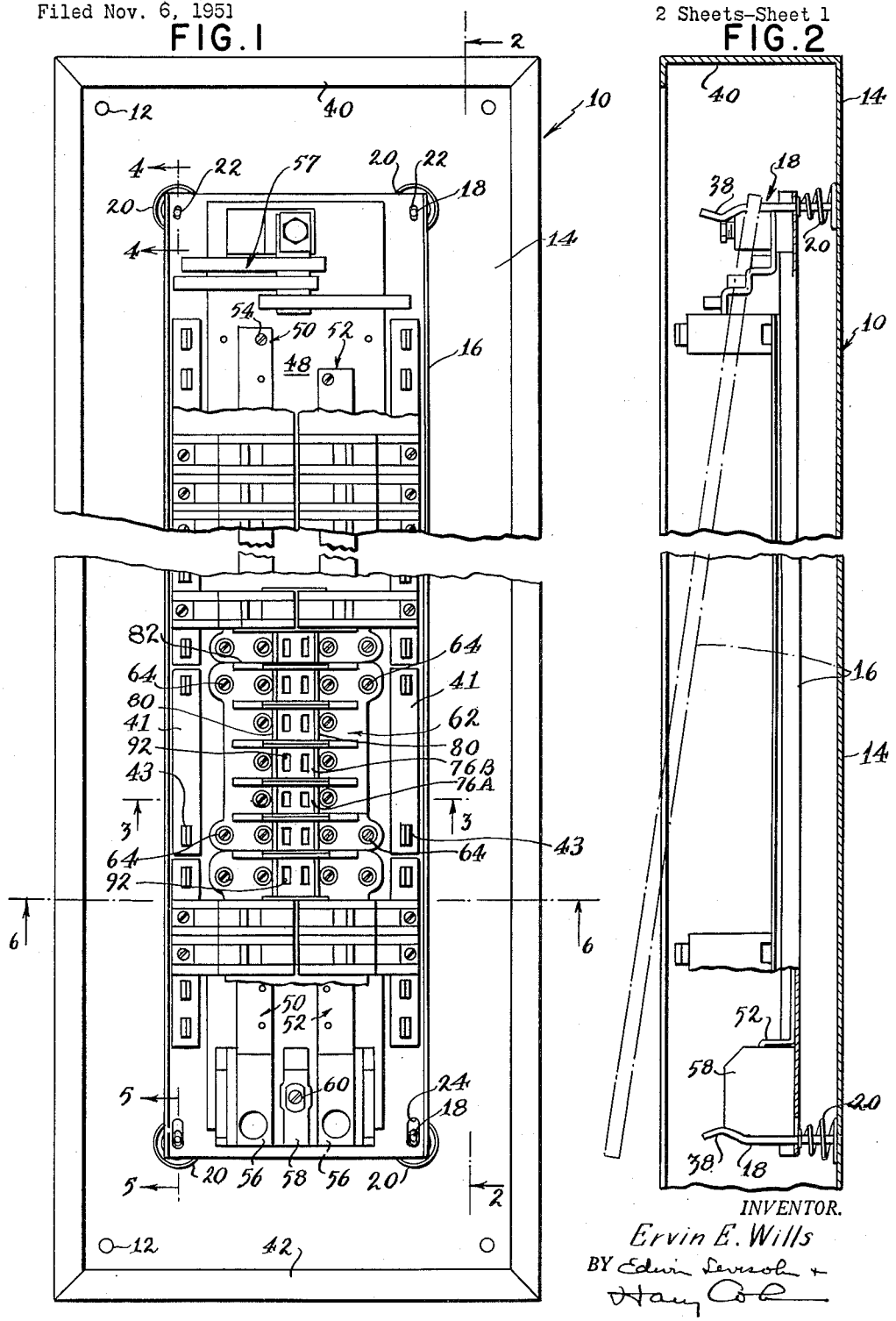

United States Patent Office 2,760,123
Patented Aug. 21, 1956

2,760,123

ENCLOSED PANELBOARD MOUNTING

Ervin E. Wills, Affton, Mo., assignor to Federal Electric Products Company, Newark, N. J., a corporation of Delaware Application November 6, 1951, Serial No. 255,117

13 Claims. (Cl. 317—119)

This invention relates in general to wall type installations of cabinets or enclosures for electric panel boards and in particular to means for mounting the pan or support for the electric instrumentalities thereof. This application is a continuation in part of my United States application Serial No. 240,661, filed August 7, 1951.

Panel board arrangements of the type under consideration generally include a sheet metal box or enclosure containing a back plate or mounting pan adapted to mount and support a panel of circuit protector devices, such as for example, circuit breakers, fuses, switches, starters, etc., or any combination thereof, a door and trim or front plate, and a shield or panel housing which completes the barrier between the panel and the front plate. Where the cabinet is to be flush mounted in a wall, the box or enclosure is ordinarily set in the wall during the course of construction and front plate is put in place after the finish plaster has been completed. However, for various reasons, the box or enclosure, after the completion of the finish plastering, is frequently found to be out of true, it being usually impossible to predetermine accurately how far back it will be from the finish plaster line. In providing for a "plaster adjustment" for the circuit protective devices, means are usually provided to resiliently urge the mounting pan toward the front of the enclosure for adjusting the mounting pan to expeditiously align the protective devices with the face of the enclosure and the wall surface by biasing said devices against the protective shield therefore. However, with the shield removed, for example for wiring said devices in the enclosure, it is possible that the mounting pan may accidently slip off its mounting means.

Therefore, it is an object of the present invention to provide for mounting the pan within the enclosure in such a manner that the pin will be prevented from accidently slipping off its mounting means.

Pursuant to the foregoing object, the pan is resiliently mounted on a plurality of rods extending from the rear of the enclosure toward the front thereof, and it is therefore another object to provide means to prevent the pan from slipping off the rods when the front cover or trim plate is removed from the enclosure.

Another object is the provision of improved mounting means for the pan utilizing resilient means which occupy a minimum front to rear space in the enclosure when the pan is in the maximum inward position thereof within said enclosure.

A further object is to provide an improved terminal connector arrangement for the electrical devices carried by the mounting pan.

The above and other objects, features and advantages of the present invention will be more fully understood from the following description considered in connection with the accompanying drawings.

In the drawings:

Fig. 1 is a front view of an enclosure pursuant to the present invention, the cover and shield housing thereof being removed, and parts being broken away for the purpose of illustration;

Fig. 2 is a sectional view taken on the line 2—2 of Fig. 1 with parts broken away for the purpose of illustration;

Fig. 3 is a sectional view on an enlarged scale taken on the line 3—3 of Fig. 1, and showing a circuit breaker in position on the mounting pan;

Fig. 4 is a fragmentary sectional view, on an enlarged scale, taken on the line 4—4 of Fig. 1;

Fig. 5 is a fragmentary sectional view, on an enlarged scale, taken on the line 5—5 of Fig. 1; and Fig. 6 is a sectional view taken on the line 6—6 of Fig. 1 and including the front closure and shield of the enclosure, certain of the parts being omitted.

Referring now to the drawings in detail, there is shown a box or enclosure 10 of any suitable type and provided, as usual, with knockouts or other means for the introduction of the electrical connectors and with mounting apertures 12, said box being preferably formed of sheet metal. As here shown, the rear wall 14 of the enclosure 10 is provided with means to adjustably mount therein a mounting pan or back plate 16. More specifically, the back plate is provided with the four posts or rods 18 which extend outwardly from the rear wall toward the front of the enclosure. Each rod is provided with a resilient volute member constituted by a helically coiled tapered spring member 20 (Figs. 4 and 5). In order to receive the rods 18, the pan 16 is provided, at the upper end corners thereof, with the apertures 22 which receive the upper rods 18 with slight clearance, and adjacent the lower corners thereof of the pan is provided with the elongated slots 24. It will be understood that, when mounted within the enclosure, the pan is supported by said upper rods and is positioned within the enclosure 10 by all of the rods. From the foregoing it will be apparent that the spring members 20, being disposed between the pan 16 and the rear wall 14, tend to yieldingly resist the rearward movement of the pan toward the rear wall.

As illustrated in Fig. 6, and as is fully illustrated and described in my above identified copending application, the enclosure is provided with a front closure or trim member 26 which is suitably secured thereto and which preferably includes a front door 28 for obtaining access to the desired portions of electrical devices which may be carried by the pan 16. For example, as illustrated in Fig. 6, the pan 16 is illustrated as supporting a plurality of circuit breakers 30, as hereinafter described in detail, said circuit breakers being provided with handles or operating members 32 which are accessible when the front door 28 is opened. In addition, the front closure 26 is provided with a shield or barrier 34 which is provided with openings which align with the operating members of the circuit breakers so that the latter may project therethrough, as fully described in my copending application. From the foregoing, it will be understood that when the front closure or trim member 26 is placed in position against the outer surface S of a building wall W, in which the enclosure 10 is mounted, the shield 34 will engage the front of the circuit breakers 30 to move the pan 16 inwardly against the bias of the springs 20 to the extent required for the proper alignment of the front closure 26 against the wall surface. As previously indicated, and as is well known to those skilled in the art, the enclosure 10 is customarily inserted in an opening formed in the building wall before the outer surface of the building wall is plastered so that provision must be made for the adjustment of the pan 16 forwardly and rearwardly in order that the portions of the front closure 26 which project beyond the enclosure 10 may abut the surface S of the facing of the building wall, after the latter is finished, and also have the shield 34 engaged or lying close to the circuit breakers or other instrumentalities which are mounted on the pan 16. In this connection, as described in my copending application, the springs 20 bias the pan 16 toward the front closure 26 to tightly seal the circuit breakers against the shield 34 to compensate for variations in the mounting of the enclosure 10 and for variations in the thickness of the plaster to provide a plaster adjustment, said shield serving to prevent the entrance of dirt or other foreign material into the interior of the enclosure, as well as to prevent access to any part of the electric instrumentalities except desired or necessary portions thereof, such as the handles 32.

Pursuant to one highly desirable feature of the present invention, the springs 20, as previously indicated, are of tapered construction. By reason of the taper of the springs, the convolutions thereof can nest within each other, as the spring is compressed, so that in the fully compressed condition of the spring, for the maximum inward adjustment of the mounting pan 16 toward the rear wall 14, it will be readily apparent that the front to rear space occupied by each of the springs is no greater than the thickness of the largest spring convolution 36 (Figs. 4 and 5). This enables the enclosure 10 to be made shallower or less deep than would be the case if a non-tapered helical spring was mounted on each rod.

Pursuant to another feature of the invention the rods 18 are provided at the free ends thereof with the hooked or indented contoured portions 38, it being noted, as illustrated in Figs. 2, 4 and 5, that the hooks on the upper rods are bent in the direction of the bottom wall 42 of the enclosure and the hooks on the bottom rods are bent in the direction of the top wall 40 of the enclosure. The function of these hooked portions, especially those on the upper rods, is to prevent the pan 16 from slipping off the rods while the enclosure is being wired. In this connection, it will be understood that while the wiring is being done, the pan 16 is moved to the forward ends of the rods 18, as indicated in broken lines in Figs. 4 and 5 which show the relative disposition of an upper and a lower rod on the same side of the enclosure, so that the electrician can more easily perform the wiring that may be necessary. Thereafter, the pan and the electric instrumentalities carried thereby are moved back on the rods 18 to the normal position of the pan against the springs 20. As previously indicated, the upper apertures 22 in the pan, which receive the upper rods 18, are circular and only slightly larger in diameter than the diameter of said rods so that the pan will be prevented from slipping off the hooked ends 38 of the upper rods 18. As illustrated in Fig. 4, these ends are directed downwardly and have the lowermost or intermediate hook portions 39A disposed below the main body of the upper rods 18 whereby the pan slides off the upper rods and onto the hooks 38, as indicated in broken line. As illustrated in Fig. 5, the hook portions 38 of the lower rods, are bent toward the upper wall 42, and have their intermediate portions 38B directed upwardly of the main body of the lower rods 18. Therefore, it will be apparent, as indicated in broken line in Fig. 5, that the upwardly directed portions 38B will be engaged by the upper ends 24A of the elongated slots 24 to oppose the forward movement of the lower end 16A of the pan beyond the hook portions 38B of the lower rods 18. However, said elongated slots 24 at the lower end of the pan enable the pan to be moved upwardly from the broken line position thereof in Figs. 4 and 5 so that the upper end 16B will be moved toward the main body of the upper rods 18, which movement is required in order to move the pan rearwardly from the hooked portions 38 of the upper rods. Similarly, it will be apparent that when the upper end 16B of the pan is positioned rearwardly of the hooked portions 38 of the upper rods, the lower end may then be swung clear of the hooked portions of the lower rods, as illustrated in broken line in Fig. 2, to permit for the removal of the pan from the rods or conversely in order to initially mount the pan on the rods. When mounting the pan on the rods, the pan should be first disposed, as illustrated in broken line in Fig. 2, from which position the lower end may be readily mounted on the lower rods to clear the hooked portions thereof.

The pan 16 is preferably formed of a suitable sheet metal and is provided adjacent the side edges thereof with the preferably sheet metal members 41 which may be secured thereto in any suitable manner, for example, as by spot welding or brazing. Said members are provided with the struck-out formations or retaining elements 43 which are adapted to engage in complementary recesses provided in the circuit breaker casing 44, as illustrated at 46. It will be understood that the members 41 at each side of the pan may be constituted either by one continuous member or by a series of separate members, as illustrated in Fig. 1. Extending longitudinally thereof, and between the members 41 at the sides thereof, the pan is provided with a layer of insulation material 48 on which there extends, longitudinally of the pan, the bus bars 50 and 52. At the upper ends thereof, the bus bars are secured on the insulated plate 48, as by the screws 54, and at their lower ends the bus bars are secured to terminals 56 for connection to the power lines. Said terminals are carried in a housing 58 formed of insulating material and mounted on the pan as by the screw 60. A neutral assembly is illustrated at 57. Pursuant to the present invention, each pair of members 41, having the retaining elements 43, is provided with a companion electric device mounting member 62 positioned intermediate the pair as illustrated in Figs. 1 and 3. The member 62 is preferably molded of insulating material and is secured on the insulated plate 48 by the screws 64. In addition, said member 62 is provided with a series of screw apertures 66 which register with apertures 68 provided in the bus bar 50, and with the apertures 70 which register with the apertures 72 provided in the bus bar 52. As illustrated in Fig. 3, screws 74 extend through the apertures 66 into bus bar 50 for securing the mounting member 62 in position. A terminal connector element 76, formed of suitable conducting material, is disposed within an enclosure 78 defined in the member 62 by the barrier portions 80 thereof, which extend longitudinally of said member 62, and by the barrier portions 82 thereof, which extend transversely of said member. As illustrated in Fig. 3, it will be noted that the terminal member 76 is provided with the oppositely directed upper and lower flange portions 84 and 86, respectively. The flange portion 86 extends through an opening 88 formed adjacent the bottom of the member 62 and is engaged with the bus bar 52 by the screw 90 which enters the screw aperture 72. The upper flange 84 is provided with the slotted portions 92 which are adapted to receive the prongs or stab terminals 94 of the circuit breaker 30. It will be noted that the free end of the flange 84 is supported and maintained in position by the barrier portion 80 of the enclosure or receptacle 78 so that the flange will not bend or be otherwise distorted upon insertion of circuit breaker terminals in the slots 92. The stab terminal 94 is preferably of the type fully illustrated and described in the copending United States application of Thomas M. Cole and Paul M. Christensen, Serial No. 127,432, filed November 15, 1949, and assigned to the assignee hereof. It will be understood that the terminal elements 76 are connected alternately to the bus bars 52 and 50. More specifically, while the terminal element 76A in Fig. 1 is connected, as illustrated in Fig. 3, to the bus bar 52, it will be understood that terminal elements 76B, at either side thereof, are reversed so as to be connected to the bus bar 50. In this connection it will also be understood that where the terminal element 76 is reversed from the position illustrated thereof in Fig. 3, the apertures 70, 74 and the opening 88 is also reversed from the position thereof illustrated in said figure.

From the foregoing, and as illustrated in Fig. 3, it will be apparent that the circuit breakers are disposed directly on the mounting members 62 and are retained in position thereon by the engagement of the retaining element 43 in the aperture 46 of the casing, as well as by the engagement of the prong or stab 94 in the companion slot 92. As here shown, each mounting member 62 is adapted to accommodate a total of 10 circuit breakers, there being five circuit breakers arranged on each side thereof.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patents, is:

1. In a panelboard construction having an enclosure adapted to be secured in a wall and provided with a mounting pan for an electric device, means for mounting the pan within the enclosure comprising a mounting rod extending from the rear of the enclosure for engagement with the pan at the upper end thereof, said pan being movable relative to said rod toward and away from said enclosure rear, said rod being hooked at its free end and the pan being provided with a complementary shaped aperture in which the rod is freely received whereby to prevent the pan from inadvertently slipping off the hooked end of the rod and to permit said pan to be pivoted on said rod in a direction normal to the plane of said pan.

2. In a panelboard construction having an enclosure adapted to be secured in a wall, said enclosure having a front access opening and being provided with a mounting pan for an electric device, means for mounting the pan within the enclosure for biasing the device toward the front opening comprising a mounting rod extending from the rear of the enclosure for engagement with the pan at the upper end thereof, said pan being movable relative to said rod toward and away from the opening, said rod being hooked at its free end and the pan being provided with a complementary shaped aperture in which the rod is freely received whereby to prevent the pan from inadvertently slipping off the hooked end of the rod and to permit said pan to be pivoted on said rod in a direction normal to the plane of said pan, and a resilient volute member carried by the rod and interposed between the rear of the enclosure and the pan whereby, when the pan is in the maximum inward position thereof in the enclosure, the resilient volute member will be in the fully compressed condition thereof to occupy a front-to-rear space which is substantially equal to the thickness of the largest convolution thereof.

3. In a panelboard construction having an enclosure adapted to be secured in a wall and provided with a mounting pan for an electric device, a pair of upper mounting rods extending from the rear wall of the enclosure for engagement with the pan at the upper end thereof and a pair of lower mounting rods extending from the rear wall of the enclosure for engagement with the pan at the lower end thereof, said pan being movable longitudinally of said rods and provided at the upper end thereof with a pair of substantially circular apertures in which the upper rods are received and with a pair of elongated apertures at the lower end thereof in which the lower rods are received, and hooked portions provided at the free ends of said rods, respectively, the hooked portions of said upper rods being downwardly directed whereby to prevent the pan from inadvertently slipping off the upper rods, and the hooked portions of said lower rods being upwardly directed so as to be engaged by the upper ends of the elongated apertures, respectively, to oppose forward movement of the lower end of the pan beyond the hooked portions of the lower rods.

4. In a panelboard construction having an enclosure adapted to be secured in a wall, said enclosure having a front access opening and being provided with a mounting pan for an electric device, means for resiliently mounting the pan within the enclosure for biasing the device toward the front opening comprising a fixed mounting rod extending from the rear of the enclosure for supporting said pan, said pan being movable relative to said rod toward and away from the opening, and a resilient volute member carried by the rod and interposed between the rear of the enclosure and the pan whereby, when the pan is in the maximum inward position thereof in the enclosure, the resilient volute member will be in the fully compressed condition thereof to occupy a front-to-rear space which is substantially equal to the thickness of the largest convolution thereof, said pan comprising an elongated member provided with electric device holding formations disposed along the longitudinal sides thereof, bus bars extending longitudinally of the pan between said holding formations, and an insulated electric device mounting unit overlying said bus bars and carried by said pan intermediate said holding formations, said mounting unit having provision to mount the device in spaced disposition relative to said pan and being provided with terminal elements connected to said bus bars and adapted for connection to the electric devices, said elements being aligned with said holding formations respectively, whereby to hold therebetween a device mounted on said unit.

5. A mounting pan for electric devices comprising an elongated member provided with electric device holding formations disposed along the longitudinal sides thereof, bus bars extending longitudinally of the pan between said holding formations, and an insulated electric device mounting unit overlying said bus bar and carried by said pan intermediate said holding formations, said mounting unit having provision to mount the device is spaced disposition relative to said pan and being provided with a plurality of terminal elements connected to said bus bars and adapted for connection to the electric devices, said elements being aligned with said holding formations respectively, whereby to hold therebetween a device mounted on said unit.

6. In an enclosure for an electric device, said enclosure having an opening for access to the interior thereof, mounting means in said enclosure for the electric device comprising a pan and vertically spaced supporting members, said pan being supported by at least one of said members and movable in relation thereto toward and away from said opening of the enclosure, an upper one of said supporting members having a downwardly directed end portion engageable by said pan to prevent the accidental disengagement of said pan from said upper supporting member, and a lower one of said supporting members having an upwardly directed end portion engageable by said pan when the latter engages said downwardly directed end portion whereby to limit the movement of the pan toward said opening.

7. In an enclosure for an electric device, said enclosure having an opening for access to the interior thereof, mounting means in said enclosure for the electric device comprising a pan and vertically spaced supporting members, said pan being supported by at least one of said members and movable in relation thereto toward and away from said opening of the enclosure, an upper one of said supporting members having a downwardly directed end portion engageable by said pan to prevent the accidental disengagement of said pan from said upper supporting member, and a lower one of said supporting members having an upwardly directed end portion, said pan being provided with an elongated opening through which said lower supporting member extends, the upper end of said elongated opening being engageable with said upwardly directed end portion when said pan engages said downwardly directed end portion to limit the movement of the pan toward said opening.

8. In an enclosure for an electric device, said enclosure having an opening for access to the interior thereof, mounting means in said enclosure for the electric device comprising a pan and vertically spaced mounting members, said pan being mounted for movement longitudinally of said members toward and away from said opening of the enclosure, an upper one and a lower one of said members having oppositely directed end portions, respectively, engageable by said pan to limit the movement of the latter toward said opening, said pan being provided with an elongated opening through which one of said members extends to provide for the movement of said pan transversely of said members.

9. A panelboard construction for electric devices comprising a mounting pan having electric device holding formations at opposite sides thereof, and spaced from the plane of said pan a mounting unit for said devices disposed between said formations, said unit having a plurality of terminal receptacles spaced from the plane of said pan and a portion between said formations and said receptacles for mounting said devices therebetween, a terminal member disposed in each of said receptacles, and at least a pair of bus bars underlying said unit, certain of said terminal members being connected to one of said bus bars and others of said terminal members being connected to the other of said bus bars, said terminal members having laterally offset portions for connection to said devices, respectively, each of said offset portions being mounted on a marginal edge of a companion receptacle to prevent possible distortion of the terminal member upon engagement of an electric device.

10. In combination, a panel unit for mounting electric devices, and at least a pair of bus bars, said unit being an insulation member in which there is defined a plurality of terminal receptacles, a terminal member mounted in each receptacle, said unit overlying said bus bars, certain of said terminal members being connected to one of said bus bars, and others of said terminal members being connected to the other of said bus bars, said terminal members having laterally offset slotted portions of receive cooperating terminals of said devices, respectively, and marginal portions of said receptacles underlying said slotted portions to prevent possible distortion thereof upon insertion therein of said cooperating terminals, respectively.

11. In an enclosure for an electric device, said enclosure having an opening for access to the interior thereof; mounting means in the enclosure for the electric device, comprising a pan and spaced supporting members extending forwardly of the rear of the enclosure, said spaced supporting members being provided with contoured portions directed toward each other, said pan having a pair of apertures for reception of said supporting members therein to support said pan thereon, the distance between the remote surfaces of the portions of said supporting members rearward of said contoured portions being substantially equal to the distance between the remote edges of said apertures whereby to prevent movement of said pan in its own plane when supported by said supporting members rearwardly of said contoured portions, the contoured portion in one of said supporting members being engageable by said pan to prevent accidental disengagement of said pan from said one supporting member, the contoured portion in the other of said supporting members being engageable by said pan when said pan engages said contoured portion in said one supporting member to limit movement of said pan toward said opening.

12. In an enclosure for an electric device, said enclosure having an opening for access to the interior thereof; mounting means in the enclosure for the electric device, comprising a pan and spaced supporting members extending forwardly of the rear of the enclosure, said spaced supporting members being provided with contoured portions directed toward each other, said pan having a pair of apertures for reception of said supporting members therein to support said pan thereon, one of said apertures being substantially the same size and shape as the cross-section of its associated supporting member rearwardly of its contoured portion and the other of said apertures being substantially larger than the cross-section of its associated supporting member rearwardly of its contoured portion, the contoured portion in one of said supporting members being engageable by said pan to prevent accidental disengagement of said pan from said one supporting member, the contoured portion in the other of said supporting members being engageable by said pan when said pan engages said contoured portion in said one supporting member to limit movement of said pan toward said opening.

13. In an enclosure for an electric device, said enclosure having an opening for access to the interior thereof; mounting means in the enclosure for the electric device, comprising a pan and spaced supporting members extending forwardly of the rear of the enclosure, said spaced supporting members being provided with contoured portions directed toward each other, said pan having a pair of apertures for reception of said supporting members therein to support said pan thereon, one of said apertures being substantially the same size and shape as the cross section of its associated supporting member rearwardly of its contoured portion and the other of said apertures being substantially larger than the cross-section of its associated supporting member rearwardly of its contoured portion, the distance between the remote surfaces of the portions of said supporting members rearward of said contoured portions being substantially equal to the distance between the remote edges of said apertures whereby to prevent movement of said pan in its own plane when supported by said supporting members rearwardly of said contoured portions, the contoured portion in one of said supporting members being engageable by said pan to prevent accidental disengagement of said pan from said one supporting member, the contoured portion in the other of said supporting members being engageable by said pan when said pan engages said contoured portion in said one supporting member to limit movement of said pan toward said opening.

References Cited in the file of this patent
UNITED STATES PATENTS

| | | |
|---|---|---|
| 411,588 | Dickson | Sept. 24, 1889 |
| 1,203,582 | Chase | Nov. 7, 1916 |
| 1,902,790 | Starrett | Mar. 21, 1933 |
| 1,996,699 | Erhard | Apr. 2, 1935 |
| 2,138,408 | Rowe | Nov. 29, 1938 |
| 2,183,872 | Rowe | Dec. 19, 1939 |
| 2,246,323 | Schaelchlin | June 17, 1941 |
| 2,530,548 | Stanley | Nov. 21, 1950 |
| 2,599,695 | Christensen | June 10, 1952 |
| 2,647,225 | Cole | July 28, 1953 |